Figure 1:
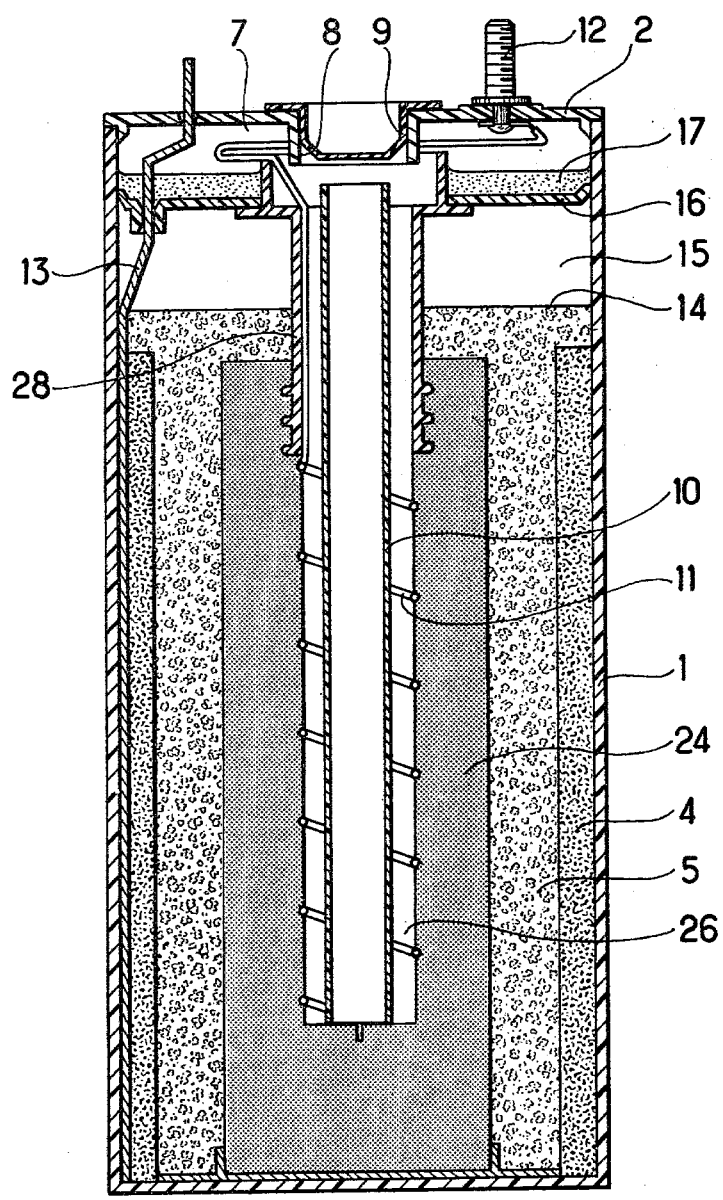

United States Patent [19]

Chevet et al.

[11] 4,214,044
[45] Jul. 22, 1980

[54] AIR-DEPOLARIZED CELL

[75] Inventors: Robert Chevet, St. Benoit; Pierre Lenfant, Buxerolles, both of France

[73] Assignee: Compagnie Industrielle des Piles Electriques "CIPEL", Levallois-Perret, France

[21] Appl. No.: 44,256

[22] Filed: May 31, 1979

Related U.S. Application Data

[63] Continuation of Ser. No. 895,396, Apr. 11, 1978, abandoned.

[30] Foreign Application Priority Data

Apr. 14, 1977 [FR] France .................. 77 11234

[51] Int. Cl.$^2$ .................................. H01M 12/06
[52] U.S. Cl. .................................. 429/27; 429/42; 264/272
[58] Field of Search ............. 429/27, 28, 42, 29; 264/272

[56] References Cited

U.S. PATENT DOCUMENTS

| | | | |
|---|---|---|---|
| 2,213,429 | 9/1940 | Heise et al. | 429/27 |
| 2,724,010 | 11/1955 | Fisher et al. | 429/27 |
| 3,871,920 | 3/1975 | Grebler | 429/27 |

FOREIGN PATENT DOCUMENTS

| | | | |
|---|---|---|---|
| 4712094 | 9/1967 | Japan | 429/27 |
| 497850 | 12/1938 | United Kingdom | 429/27 |

Primary Examiner—Donald L. Walton
Attorney, Agent, or Firm—Kenyon & Kenyon

[57] ABSTRACT

The air-depolarized cell comprises a positive electrode having a catalytic mass, a negative electrode, an electrolyte disposed between the electrodes, a gas space above the assembly formed by the negative electrode and the electrolyte, a ventilation duct passing through the positive electrode to convey oxygen into the catalytic mass, and a source of oxygen which is separated from the said gas space by a wall impermeable to oxygen. In accordance with the invention the said duct is connected to the said source of oxygen by a tube impermeable to oxygen which is hermetically sealed to the said wall and to the catalytic mass which is situated entirely below the free surface of the electrolyte.

5 Claims, 2 Drawing Figures

AIR-DEPOLARIZED CELL

This is a continuation of application Ser. No. 895,396 filed Apr. 11, 1978 and now abandoned.

The invention relates to air-depolarized cells which comprise a positive catalytic electrode in which is provided a ventilation duct, a negative electrode and an electrolyte which separates the electrodes.

It relates more particularly to cells whose negative electrode is alterable by oxygen from the air such as, for example, a cell with an alkaline electrolyte and a powdered zinc negative electrode. In cells of this type, the oxygen must be brought into the ventilation duct but it must not reach the free surface of the electrolyte, where it could dissolve and oxidize the negative electrode, thus decreasing the useful capacity of the cell.

In a known type of cell, illustrated for example by French Pat. No. 71 36495 of Oct. 11, 1971, published under No. 2,155,855, the ventilation duct of the positive electrode communicates with a ventilation chamber which constitutes a source of oxygen situated above the free space which surmounts the assembly formed by the electrolyte and the negative electrode and separated from this space by a horizontal wall through which the positive electrode passes. The free space is thus separated from the duct by the thickness of the catalytic mass of the electrode. Since this mass is necessarily porous and permeable to oxygen, it is also known to cover and/or to impregnate that part of its surface which is in contact with the free space with a sealing material such as pitch.

However, it is observed that this measure is not sufficient to constitute an effective barrier against oxygen and to prevent the chemical oxidation of the zinc in the negative electrode. In some variants of cells illustrated in French Pat. No. 2,155,855 mentioned hereinabove, a metal current collector tube is provided engaging the wall of the ventilation duct. This collector also provides some kind of separation between the duct and the gas space, but the effectiveness of this separation is reduced by the perforations which provide access to the catalytic mass for the oxygen. Indeed, if the electrodes are to operate homogeneously, these perforations must be provided up to the top of the negative electrode, hence up to the vicinity of the free surface of the electrolyte, this allowing a relatively easy passage of the oxygen up to the gas space situated above this free surface. Further, the upper end of the catalytic mass is in direct contact with the ventilation chamber and provides a very short path for the oxygen between this chamber and the gas space.

The invention aims to avoid these disadvantages.

The invention provides an air-depolarized cell which comprises a positive electrode which includes a catalytic mass, a negative electrode, an electrolyte disposed between the electrodes, a gas space which surmounts the assembly formed by the negative electrode and the electrolyte, and a ventilation duct provided through the positive electrode to bring oxygen into the catalytic mass and connected to a source of oxygen separated from said gas space by a wall which is impermeable to oxygen wherein the said duct is connected to the said source of oxygen by a tube which is impermeable to oxygen, and which is in sealed contact with said wall and with said catalytic mass which is situated entirely below the free surface of the electrolyte.

The tube thus disposed perfectly insulates the gas space and avoids the entry of any air therein.

Further, having no part of the catalytic mass lying above the free surface of the electrolyte improves the performance per volume and per weight of the cell.

Preferably the tube is electrically conductive and constitutes a current collector for the positive electrode.

Figure 2:
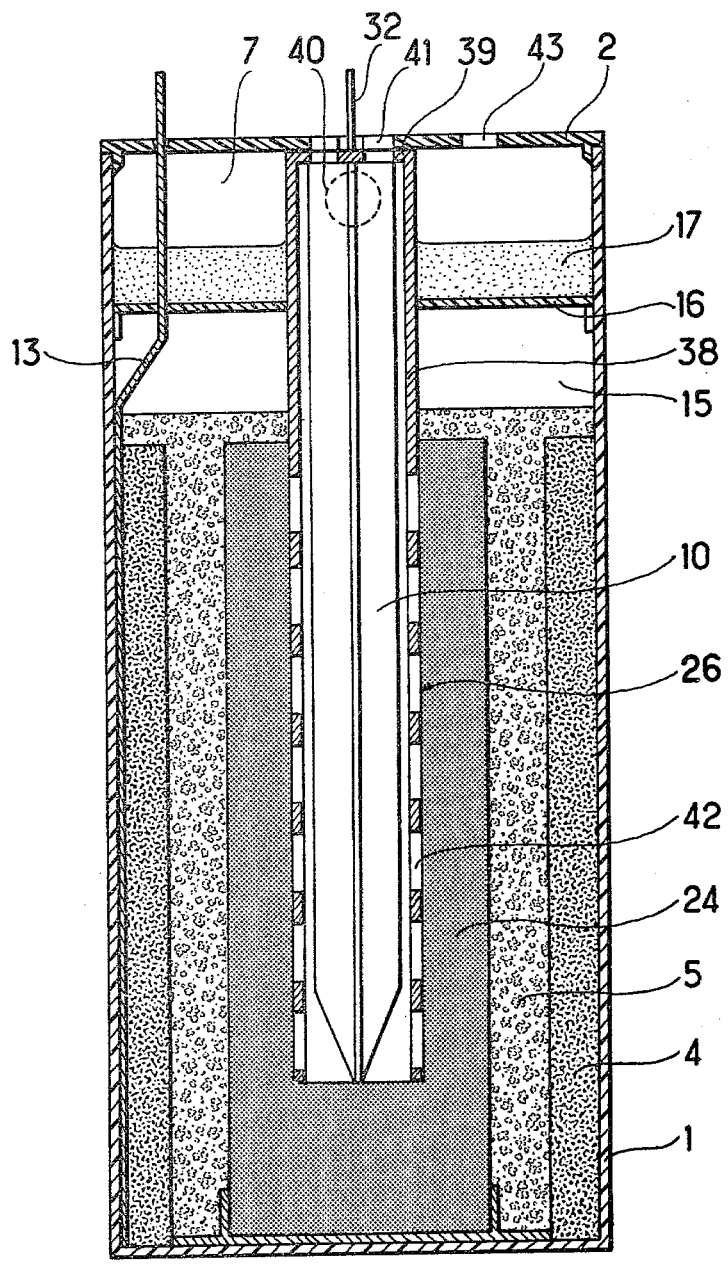

The invention will be better understood from the description of two embodiments given hereinbelow by way of example, with reference to the accompanying drawings in which FIGS. 1 and 2 are respective cross-sections of two variants of cells in accordance with the invention.

The cell shown in FIG. 1 has a casing made of plastics material formed by a can 1 and a cover 2. Inside the casing, there is a central positive air-depolarized electrode essentially made of a carbon powder catalytic mass 24 and a zinc powder negative electrode 4 disposed against the side walls of the can 1. The annular space between the electrodes is occupied by a gelled alkaline electrolyte 5 which also covers the upper part of the negative electrode. A vertical ventilation duct 26 passing through the mass 24 supplies the mass 24 with air and is connected via a tube 28 to a ventilation chamber 7 situated immediately below the cover 2. At its centre, this cover has an opening 8 shown stopped by a plastics plug 9. The plug must be removed to allow the cell to operate. The opening 8 then makes the chamber 7 communicate with the outside atmosphere, which thus constitutes an oxygen supply for the positive electrode. An H section member 10 for promoting the flow of air in accordance with British Pat. No. 1,382,390 and corresponding U.S. Pat. No. 3,871,920 is disposed in the duct 6. A metal wire 11 wound in a helix along the duct 6 and embedded in the mass 3 constitutes a current collector for the positive electrode and is connected to the positive terminal 12. The collector of the negative electrode is constituted by a metal wire 13 sunk in the electrode 4 and which passes through the cover 2.

The free surface 14 of the electrolyte 5 is surmounted by a gas space 15 which compensates the changes in volume due to the variations in temperature and to the discharge process of the cell. In order to prevent the oxygen of the air form entering the space 15, where it could chemically oxidize the zinc powder of the negative electrode, the space 15 is separated from the ventilation chamber 7 by means of a horizontal wall impermeable to oxygen constituted by a plastics part 16 covered with a layer of pitch 17 and is in sealed contact with the tube 28. The tube can be glued to the wall 16 and the layer of pitch 17 provides or improves the seal at this point. As for the mass 24, it surrounds the lower part of the tube 28 hermetically. This hermetic seal can be obtained in particular by moulding the mass round the tube. If, for example, the tube 28 is made of polystyrene or of a copolymer of styrene such as the copolymer acrylonitrile-butadiene-styrene (ABS) and the mass 24 is made of a mixture of catalytic material (carbon) with polystyrene used as a binding agent and a solvent of polystyrene (chlorinated hydrocarbon, aromatic hydrocarbon, ketone), the solvent dissolves the material of the tube superficially, this causing excellent adherence of the mass.

In the cell shown in FIG. 2, the components which are the same as those of FIG. 1 are referred to by the same reference numbers. This cell differs from the cell of FIG. 1 mainly by the fact that the tube 28 and the helical collector wire 11 are both replaced by a metal tube 38 which extends from the cover 2 to the bottom of the duct 6 and which is provided with an upper transversal wall 39 in direct contact with the output terminal 32 which passes through the centre of the cover 2.

The ventilation chamber 7 is put in relation with the outside atmosphere by means of orifices 43 provided in the cover.

The interior of the tube 38 which constitutes the ventilation circuit of the positive electrode communicates with:

the chamber 7 by perforations 40 which allow fresh air to enter the tube;

the outside atmosphere by perforations 41 provided in the wall 39 which allow the air depleted in oxygen to escape; and the catalytic mass 24 by perforations 42 which allow the access of oxygen into the catalytic sites of the electrode.

The function of the perforations 40, 41 and 42, in connection with the profiled component 10 is that explained in the above-mentioned British Pat. No. 1,382,390 and U.S. Pat. No. 3,871,920. But there are no perforations between the level of the wall 16 which separates the gas space 15 from the chamber 7 and the level where the tube 38 emerges from the mass 4. This non-perforated portion of the tube therefore constitutes the hermetic separation between the space 15 and the ventilation circuit in accordance with the present invention.

To remove any hydrogen which may be evolved in the space 15 by the electrolyte corroding the zinc, the cells in accordance with the invention can advantageously be provided with a valve.

In the present description, all the indications of direction or which show a relation of position (horizontal, vertical, above, etc) relate to the normal operating position of the cell.

Of course, the invention is not limited to the embodiments which have just been described. Without going beyond the scope of the invention, all means can be replaced by any equivalent means.

What is claimed is:

1. An air-depolarized electric cell having a casing with oxygen-impermeable bottom and sides, a positive electrode including a catalytic mass containing an organic binder, a negative electrode, an electrolyte disposed between the electrodes, an oxygen-impermeable transverse wall sealed to the sides of the casing and spaced above the negative electrode and electrolyte to provide a gas space between the wall and the electrolyte, a ventilation duct formed within the positive electrode, and a tube sealingly extending through said transverse wall and entering the ventilation duct for connecting the interior of the catalytic mass to a source of oxygen on the other side of the transverse wall from said gas space, wherein the improvement comprises:

said tube being made of a plastic material impervious to oxygen, the catalytic mass being molded around the tube, and the binder for the catalytic mass and the plastic material of the tube being chosen to have a common solvent, so that the material of the tube is superficially dissolved by said solvent to provide strong adherence of the catalytic mass to the tube.

2. An air-depolarized electric cell according to claim 1 wherein said binder comprises polystyrene.

3. An air-depolarized electric cell according to claim 2 wherein the material of the tube is selected from the group consisting of polystyrene and the copolymers of styrene.

4. A process for making a positive electrode for an air-depolarized electric cell comprising:

preparing a mixture of a catalytic material, a polystyrene binder, and a solvent for polystyrene and molding said mass around the end of a tube made of a plastic material selected from the group consisting of polystyrene and copolymers of polystyrene, whereby said solvent superficially dissolves the material of said tube to provide strong adherence of the catalytic mass to the tube.

5. A process for making a positive electrode according to claim 4 wherein said solvent is selected from the group consisting of chlorinated hydrocarbons, aromatic hydrocarbons, and ketones.

* * * * *

UNITED STATES PATENT AND TRADEMARK OFFICE
CERTIFICATE OF CORRECTION

PATENT NO. : 4,214,044
DATED : 22 July 1980
INVENTOR(S) : Robert Chevet and Pierre Lenfant It is certified that error appears in the above—identified patent and that said Letters Patent is hereby corrected as shown below:

Column 1, line 31: "scaling" should be --sealing--.

Column 2, line 45: "form" should be --from--.

Signed and Sealed this

Twenty-fifth Day of November 1980

[SEAL]

Attest:

SIDNEY A. DIAMOND

Attesting Officer     Commissioner of Patents and Trademarks